United States Patent [19]

Newton

[11] Patent Number: 4,459,124
[45] Date of Patent: Jul. 10, 1984

[54] DRIVE CHAIN

[76] Inventor: Alan R. Newton, 67 Bluebird Ave., East Wareham, Mass. 02538

[21] Appl. No.: 202,477

[22] Filed: Oct. 31, 1980

[51] Int. Cl.³ ............................................. F16G 13/02
[52] U.S. Cl. .................................. 474/210; 474/206; 474/208
[58] Field of Search ............... 474/210, 208, 206, 212, 474/213

[56] References Cited

U.S. PATENT DOCUMENTS

| | | | |
|---|---|---|---|
| 1,894,600 | 1/1933 | Schmidt | 474/208 |
| 2,297,813 | 10/1942 | Stork | 474/210 X |
| 2,550,995 | 5/1951 | Gran | 474/210 |
| 2,649,812 | 8/1953 | Wylie | 474/210 X |
| 2,893,540 | 7/1959 | Freeman | 474/210 X |
| 2,960,210 | 11/1960 | Jorgenson | 474/210 X |
| 3,178,239 | 4/1965 | Zeller | 474/208 X |
| 3,864,851 | 2/1975 | Guntert | 474/210 X |
| 3,905,304 | 9/1975 | Ord | 474/210 X |
| 3,952,860 | 4/1976 | Specht | 474/210 X |
| 4,290,762 | 9/1981 | Lapeyre | 474/210 |

Primary Examiner—Leslie A. Braun
Assistant Examiner—Michael D. Bednarek
Attorney, Agent, or Firm—Wolf, Greenfield & Sacks

[57] ABSTRACT

The sprocket drive chain of this invention is particularly adapted for right angle drive but may also be used for straight or various other angular drive situations. The construction lends itself to ease of manufacture and especially for the automated manufacture of chain. In the preferred embodiment the chain comprises interlocked links rotatably coupled, such as by a pin and bushing combination, with stamped side plates to provide an intermediate tooth (sprocket) opening. The successive openings are adapted to receive a tooth at opposite 90° angles thus readily being adapted to a right angle drive. Other embodiments employ a common pivot to support the side plates in successive 90° opposite directions, and a single plate version useable with a slotted tooth sprocket.

16 Claims, 15 Drawing Figures

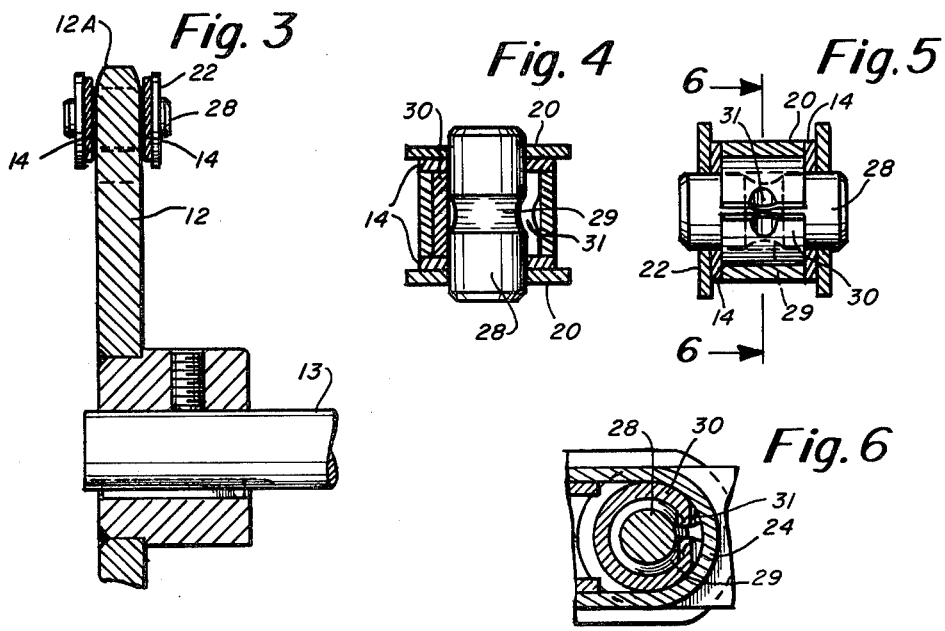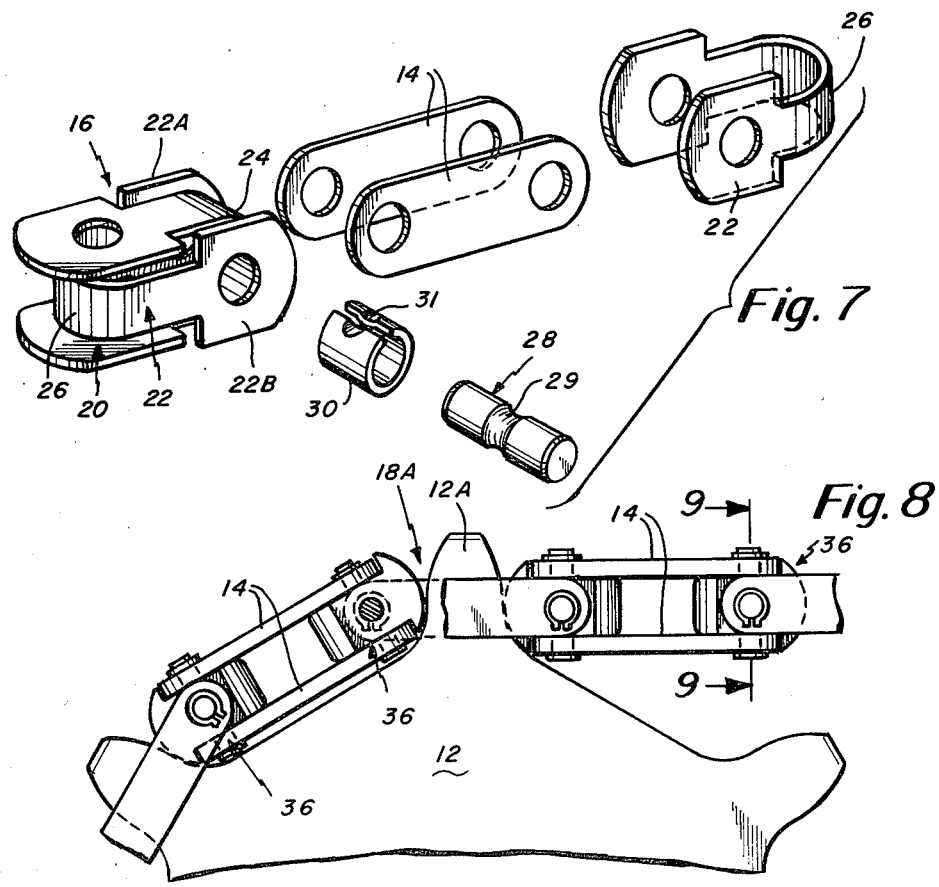

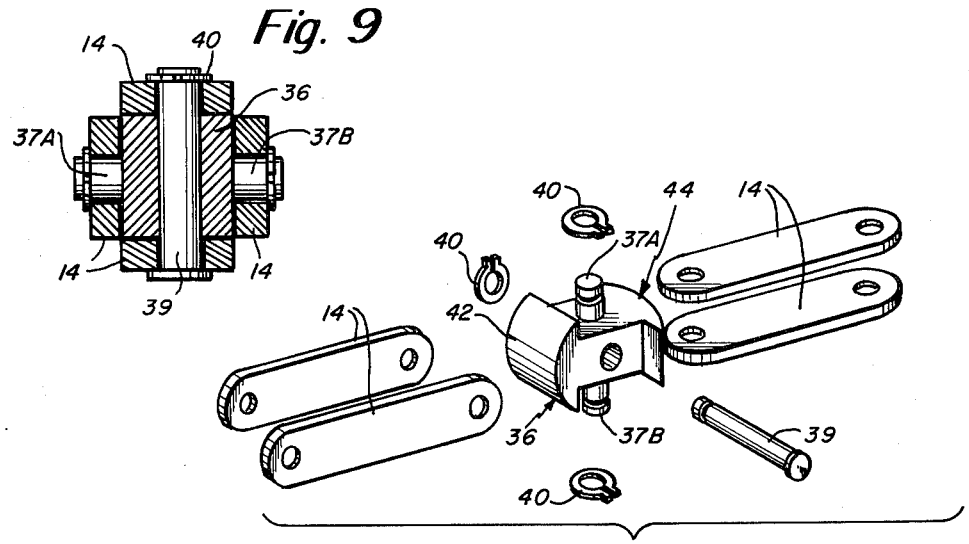
Fig. 9
Fig. 10
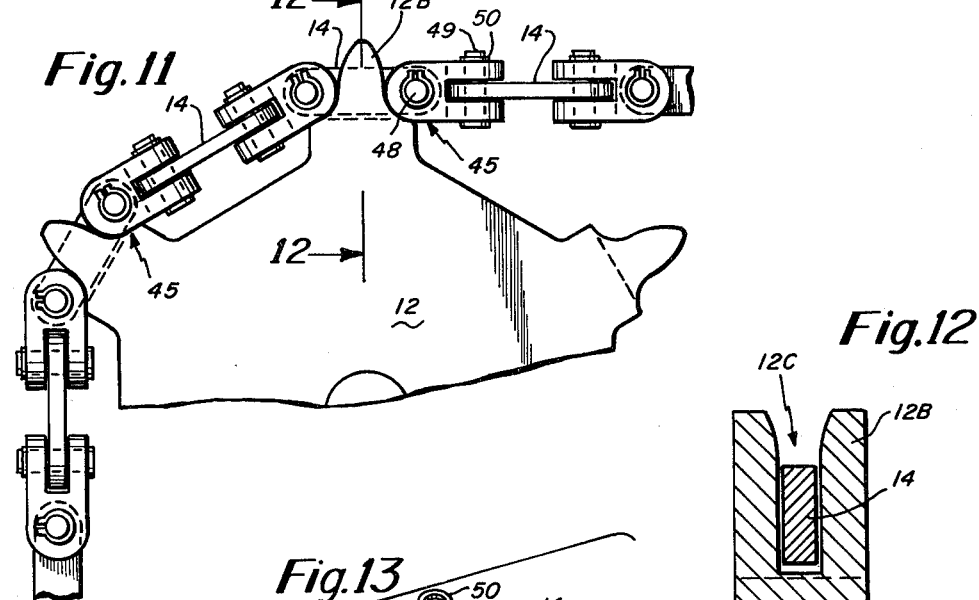
Fig. 11
Fig. 12
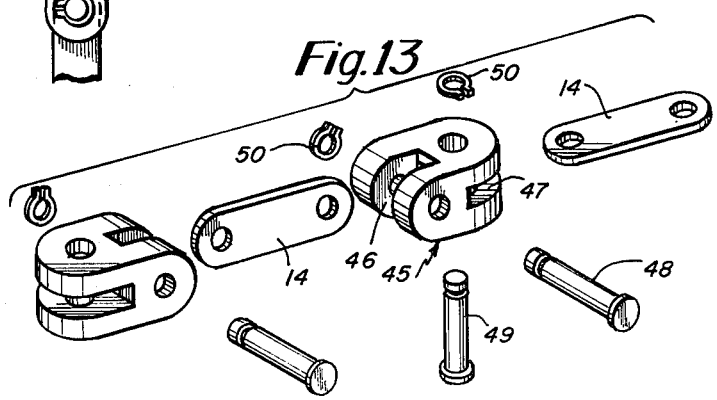
Fig. 13

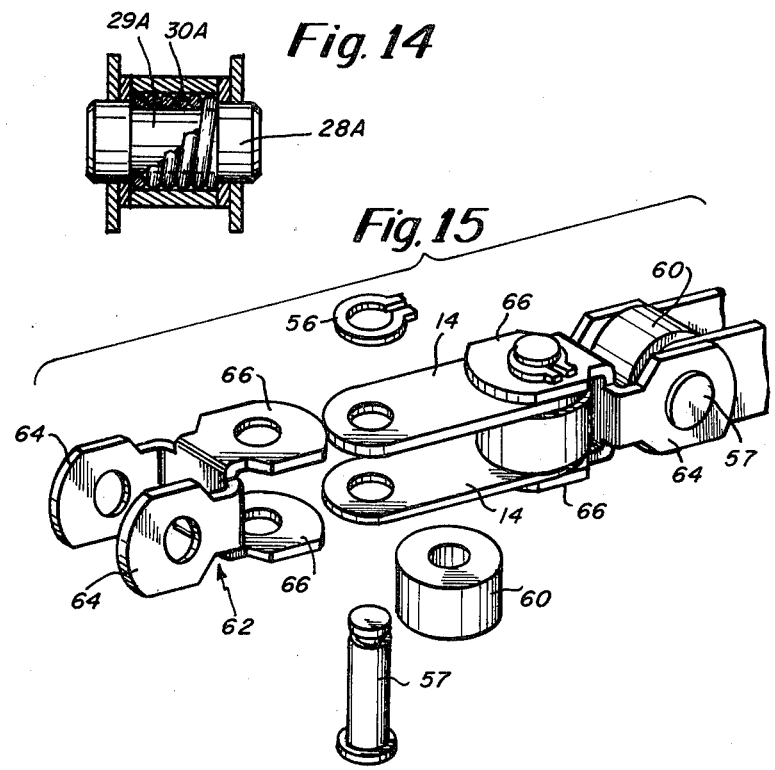

DRIVE CHAIN

BACKGROUND OF THE INVENTION

The present invention relates in general to a drive chain and pertains, more particularly, to an improved right angle sprocket drive chain, and one in particular which lends itself to ease of automated manufacture.

There are a number of prior art patents that describe different types of drive and conveyor chains. For example, reference may be made to U.S. Pat. Nos. 2,365,866; 2,010,124; 3,019,665; 3,394,608; and 3,368,418. Although some of these patents pertain to sprocket drives adapted for driving in more than one plane, the construction of the chain is relatively complex and is not readily adapted to ease and economy of manufacture. Furthermore, these prior chain constructions are not readily adapted to provide successive openings, one primarily only adapted for a first direction of sprocket engagement with an adjacent one adapted for a 90° opposite direction of sprocket engagement. For example, the Dalrymple U.S. Pat. No. 2,365,866 shows a chain opening wherein a sprocket opening may receive a tooth for engagement at the one opening at right angles, such as when a secondary sprocket is used at 90° to the main sprocket.

Accordingly, one object of the present invention is to provide an improved drive chain construction and one which is particularly adapted for right angle driving.

Another object of the present invention is to provide an improved drive chain construction which is particularly adapted for ease of and economy of manufacture.

Another object of the present invention is to provide an improved chain construction which is particularly simple in construction and is readily adapted to automated manufacture of the chain.

SUMMARY OF THE INVENTION

To accomplish the foregoing and other objects of this invention there is provided a chain that is adapted for right angle drive and that is particularly designed to be of simple construction and one that is readily adapted for ease of manufacture. There is disclosed herein, three separate embodiments of the present invention. The chain of this invention basically comprises a pair of successive sets of planar links with each set having at least one link. In the preferred embodiment there are a pair of links that are employed. However, in one of the embodiments described herein a single link is used in combination with a slotted sprocket tooth. The chain also comprises a pivot link having opposite first and second ends, and means for pivotally securing the planar links to the pivot link, comprising a first pivot member associated with the first end of the pivot link for disposing one set link in a first direction and a second pivot member associated with the second end of the pivot link for disposing another set link in a second direction substantially transverse to the first direction. In this way the chain is formed with successive openings with a first opening adapted for receiving a sprocket in one direction and the adjacent opening adapted for receiving a sprocket in an opposite transverse direction. Preferably, at each successive sprocket opening, the sprocket can be received in only one direction. Similarly, for the single link arrangement the successive links are disposed in alternating transverse directions so as to readily enable sprocket engagement by successive sprocket teeth in a right angle drive. The successive right angle teeth are of course on separate individual sprockets.

In accordance with a first embodiment disclosed herein, the pivot link includes a pair of oppositely disposed loop links, each having an arcuate sprocket engaging surface with the engaging surface of one link directed transversely to the engaging surface of the next successive link. Each of these loop links may be of U-shape. In this first embodiment, each pivot member may comprise a cylindrical bushing and associated pin which passes through and is adapted to connect the planar links to the pivot link. This bushing may be dimpled to cooperate with a groove in the pin.

In a second embodiment disclosed herein, the pivot link comprises a pivot block having at one end an arcuate sprocket engaging surface permitting sprocket engagement in only one direction, and to the other end an arcuate sprocket engaging surface permitting sprocket engagement in only the opposite transverse direction to said one direction. In this embodiment each pivot member interconnecting the pivot block and link may comprise a pivot pin and associated lock ring.

In a final embodiment disclosed herein there is provided a single link in each set adapted for use with a slotted sprocket tooth. In this embodiment the pivot link comprises a pivot block having at one end an arcuate sprocket engaging surface cooperating with a similarly disposed surface of an adjacent pivot block to provide a sprocket engagement in only one direction. The opposite end of the pivot block has an arcuate sprocket engaging surface that extends at a right angle to the one end sprocket engaging surface.

In the first preferred embodiment described herein the components are particularly adapted for ease of manufacture. This includes the interconnected loop links, bushings, pins, and side plates which are preferably stamped. These components are naturally adapted to fully automated assembly. Also, the chain links can be easily assembled and disassembled and can be made longer or shorter quite easily by simply pressing out the pin through the spring bushing, and reassembling by pressing the pin back in again with either a shortened or lengthened link or pair of links.

BRIEF DESCRIPTION OF THE DRAWINGS

Numerous other objects, features and advantages of the invention should now become apparent upon a reading of the following detailed description taken in conjunction with the accompanying drawings, in which:

FIG. 3 is a cross-sectional view taken along line 3—3 of FIG. 2 through one of the sprocket teeth;

FIG. 4 is a cross-sectional view taken along line 4—4 of FIG. 2;

FIG. 5 is a cross-sectional view taken along line 5—5 of FIG. 2 through another part of the chain construction;

FIG. 6 is a cross-sectional view taken along line 6—6 of FIG. 5 showing a fragment of this cross-section;

FIG. 7 is an exploded perspective view showing the basic components comprising a section of the chain;

FIG. 8 is a fragmentary elevation view showing an alternative embodiment for the chain of this invention;

FIG. 9 is a cross-sectional view taken through the pivot link of the chain along line 9—9 of FIG. 8;

FIG. 10 is an exploded view showing the components comprising a section of the chain in the second embodiment of FIG. 8;

FIG. 11 is a side elevation view showing a single sprocket with a third embodiment of the invention adapted for use with a slotted sprocket tooth;

FIG. 12 is a cross-sectional view taken along line 12—12 of FIG. 11 through one of the slotted sprocket teeth;

FIG. 13 is an exploded perspective view showing the general components comprising a section of the chain in this third embodiment;

FIG. 14 is an alternate embodiment of the invention wherein a spring replaces the dimple bushing; and FIG. 15 is a perspective view of an alternate embodiment of the invention employing a roller to partially define arcuate sprocket engaging surface.

DETAILED DESCRIPTION

Figure 1:
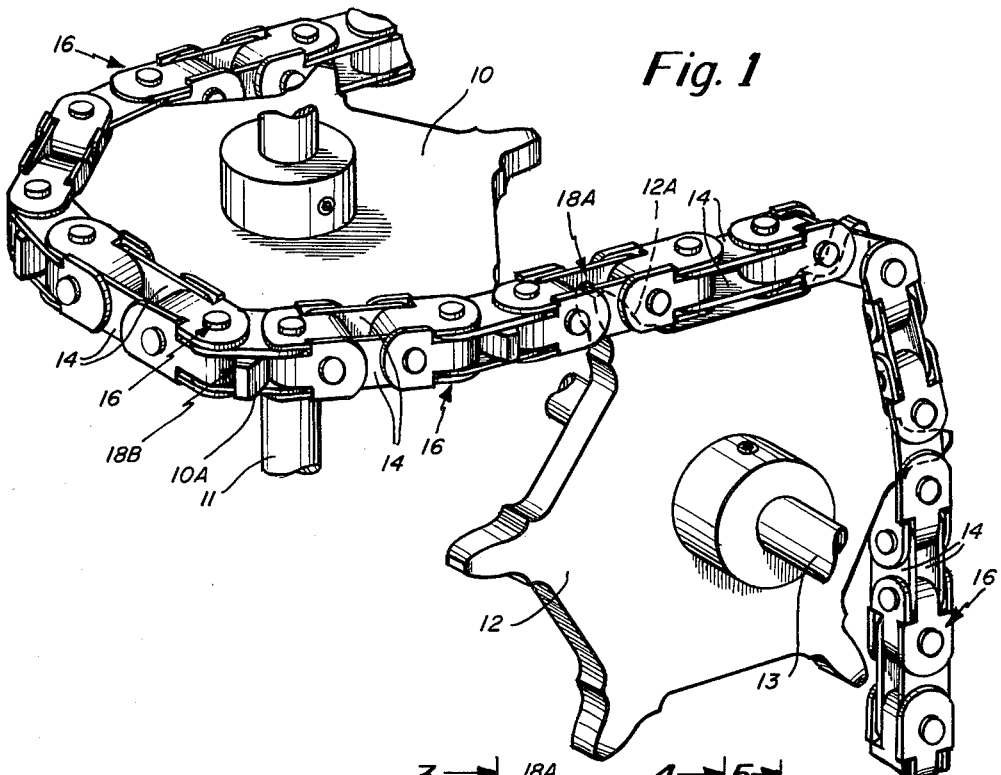
FIG. 1 is a perspective view illustrating the right angle drive of the present invention in connection with a preferred embodiment hereof.
Figure 2:
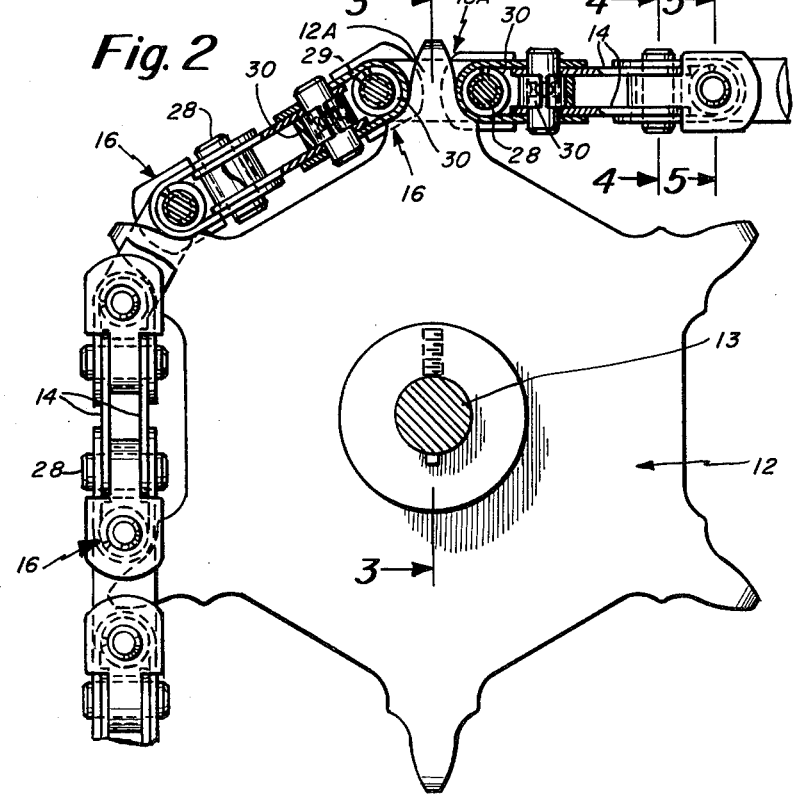
FIG. 2 is a side elevation view showing one of the sprockets and the preferred embodiment of the chain.

Referring now to the drawings, in FIGS. 1–7 there is shown a first embodiment of the present invention. All of the embodiments described herein are adapted for right angle drive, although they may readily also be used with any type of straight drive. FIGS. 8–10 show a second embodiment of the present invention while FIGS. 11–13 show a third embodiment described herein adapted for use with a slotted sprocket tooth.

FIG. 1 shows the first embodiment of the present invention in particular illustrating the adaptability to a right angle drive. In FIG. 1 there is shown a first drive sprocket 10 and a second drive sprocket 12. These drive sprockets each have six teeth and are arranged for driving at opposite 90° angles. Thus, the sprocket 10 has associated therewith a drive shaft 11 and a sprocket 12 as a corresponding drive shaft 13. FIG. 1 shows the chain of this invention engaged with each of the sprockets 10 and 12. The chain comprises successive pairs of planar links 14 with each pair interconnected at its ends to a pivot link 16. Each of the pivot links 16 in combination with the planar links 14 define a series of successive sprocket openings including, in FIG. 1, vertical openings 18A and horizontal openings 18B. There is shown a tooth 10A engaged in the opening 18B. Also, there is shown a tooth 12A associated with the vertical opening 18A.

FIGS. 2–7 show the details of the chain embodied in FIG. 1. Thus, in FIG. 2 there is shown the sprocket 12 with associated drive shaft 13. There is also shown the opening 18A for sprocket tooth 12A. As indicated previously, the chain comprises pairs of planar links 14 in separate successive sets and interconnected by the pivot link 16. The sprocket openings 18A are defined by vertically arranged links 14, such as shown in the exploded view of FIG. 7. The alternate openings 18B are defined by horizontally disposed links 14. In this first embodiment the pivot link 16 comprises a pair of U-shaped links 20, 22. The U-shaped link 20 has its arcuate surface 24 defining one side of the vertical opening such as opening 18A in FIG. 1. Similarly, the other U-shaped link 22 has an arcuate surface 26 that in part defines one of the horizontal sprocket openings such as opening 18B of FIG. 1.

The means for pivotally securing the planar links 14 to the pivot links 16 comprises the combination of a pin 28 and bushing 30 with the pin positioned within the bushing. The pin and bushing are interlocked by means of an annular groove 29 in the pin cooperating with the dimple 31 in the slotted bushing 30. FIGS. 4–6 show the interrelationship between the bushing, pin and the pivot link 16. For example, in the U-shaped link 22 there are provided end wings 22A and 22B each having a hole therethrough for receiving the pin 28. The opposite ends of the links 14 are also provided with holes, as depicted in FIG. 7. The holes in the end of the links align along with the holes in the ears 22A and 22B with the pin 28. The bushing 30 sits between the ears 22A, 22B. Similarly, at the other end of the links 14, such as shown in FIG. 7, there are circular holes that align with the holes in the ears of an adjacent U-shaped link such as the link 22. A further pin 28 passes through the planar links and the U-shaped pivot link. The means of interconnection continues from section to section. The alternate sections are arranged so that the planar links alternate at 90° angles, as clearly depicted in FIG. 1.

With the arrangement depicted in FIGS. 1–7, and in particular with the illustration of FIG. 1 it can be seen that the drive at right angles is facilitated quite easily. It is noted that with regard to the horizontal sprocket in FIG. 1, one of the teeth engage a horizontal opening quite close in position to the tooth 12A of sprocket 12 engaging a vertical opening. Thus, the sprocket drive can occur with the sprockets disposed quite close to each other. Furthermore, the construction of this present invention is quite advantageous in that the sprocket opening is defined by planar side links in combination with the U-shaped links comprising a part of the pivot link so as to provide a sprocket opening that very closely matches the contour of the sprocket itself. The drive is thus positive in engagement.

The construction of FIGS. 1–7 also adapts itself quite readily to ease of and economy of manufacture. The snap together loop links are of simple construction. The plates 14 may be stamped from standard sheet metal. The bushing and pin arrangement is easy to manufacture and quite easy to use for both assembly and disassembly of the chain. In this embodiment there are essentially only four different types of components and thus the chain is of relatively simple construction yet providing the capability of either straight drive or right angle drive.

FIGS. 8–10 show another embodiment of the present invention employing the general principles described in connection with the first embodiment. In FIG. 8 there is shown a fragment of a sprocket 12 with a tooth 12A for engaging in a vertical opening 18A. This embodiment also employs a pair of planar links 14. As depicted in the perspective view of FIG. 10, the left hand pair of links is disposed vertically while the right hand pair of links are disposed horizontally. Each of the links in a set are disposed in parallel with its adjacent link. The embodiment described in FIGS. 8–10 differs from the first embodiment primarily in the use of a single piece pivot block 36 instead of the two piece arrangement of the first embodiment employing two U-shaped links. The pivot block 36 in the second embodiment includes pivot studs 37A and 37B and a central passage for receiving at right angles the elongated pivot stud 39. These pivot studs are locked with the links 14 by means of the locking rings 40 such as shown in FIG. 10.

The pivot block 36 has upper and lower flat surfaces, as depicted in FIG. 10, for receiving the right hand horizontally disposed links 14. Similarly, the block has opposite side surfaces for receiving the vertically disposed links 14. At one end of the block there is provided arcuate surface 42 cooperating with the vertical links 14 for providing a vertical sprocket chain opening. Also, at the other end of the pivot block there is provided an arcuate surface 44 cooperating with the horizontally disposed links 14 for providing a horizontal sprocket opening. These vertical and horizontal openings alternate, of course, in the manner described previously in connection with FIG. 1.

FIGS. 11–13 show a last embodiment of the present invention for use with a sprocket 12 having a sprocket tooth 12B that is slotted at 12C. This embodiment employs a single link 14. Thus, in FIG. 13 to the left there is shown a single link 14 disposed vertically while to the right in FIG. 13 there is shown a single line 14 disposed horizontally. Each of these single links as shown in FIG. 12 is adapted to fit within the slot 12C. This last embodiment also employs a single pivot link in the form of pivot member 45 having a vertical slot 46 for receiving a left hand link 14 shown in FIG. 13, and a horizontal slot 47 for receiving the right hand link 14 shown in FIG. 13. Each of these slots define wings through which the respective pivot pins 48 and 49 pass. Each of these pins are secured at their opposite end by means of the lock ring 50.

The embodiments shown in FIGS. 11–13 is also adapted for right angle drive wherein both of the sprockets that would be employed are slotted tooth sprockets. Thus, the successive links 14 are disposed one vertically and the next horizontally in a repetitive pattern.

FIG. 15 shows still a further embodiment of the present invention which employs rollers to form the arcuate surface for engagement with the sprocket. In this embodiment the pivot link 62 comprises a single piece member having a common wall for interconnecting with a pair of vertically disposed ears 64 and a pair of horizontally disposed ears 66. Each of these pairs of ears have apertures therethrough as shown in FIG. 15. Between the pivot links 62 there are provided a pair of planar links 14 substantially the same as links previously described. A roller 60 is disposed between the pairs of ears. For example, in FIG. 15 there is shown a roller 60 disposed between the horizontally arranged ears 66. There is also provided a pin 57 that extends through the roller 60 to lock the roller 60 in place. Associated with the pin 57 is a snap ring 56 for locking the pin in place. The combination of the links 14 with the rollers 60 thus provide the opening with arcuate surfaces defined by rollers for accommodating the sprocket.

FIG. 14 shows another modification that can be used with the invention. This may be used in place of the bushing 30 depicted in FIGS. 4 and 7. Thus, there is provided a pin 28A having a reduced diameter section 29A for accommodating thereabout the spring 30A. Thus, the spring 30A essentially functions in place of the bushing 30 and is maintained essentially in a compressed position by resting within the recess 29A in the pin 28A.

Having described some embodiments of the present invention it should now be apparent to those skilled in the art that numerous other embodiments are contemplated as falling within the scope of this invention. For example, one of the embodiments such as the one shown in FIGS. 1–7 may be used in combination with the last embodiment in the event of a drive from a slotted tooth sprocket to a non-slotted tooth sprocket.

What is claimed is:

1. A chain adapted for right angle sprocket drive and comprising;
    at least two successive sets of planar links with each set having at least one link,
    a separate pivot link having opposite first and second ends,
    means for pivotally securing the planar links to the pivot link comprising a first pivot pin member associated with the first end of the pivot link for disposing one planar link of a first set in a first direction and a second pivot pin member associated with the second end of the pivot link for disposing a second planar link of a second set in a second direction substantially alternated at a 90° angle to the first direction,
    and a second pivot link including a third pivot pin member supporting an opposite end of said second planar link of said second set
    each said pivot link having at each of said opposite first and second ends means defining an arcuate sprocket tooth engaging surface extending substantially circumferentially about the axis of said pivot pin member to enclose said pivot pin member.

2. A chain as set forth in claim 1 wherein said second and third pivot members are disposed in parallel and arranged, when the chain is in engagement with a sprocket, on opposite sides of a sprocket tooth of the sprocket.

3. A chain as set forth in claim 2 wherein the second and third pivot pin members are disposed symmetrically about the sprocket tooth.

4. A chain as set forth in claim 1 wherein each set of planar links comprises two parallel arranged links.

5. A chain as set forth in claim 4 wherein said pivot link includes a pair of oppositely disposed loop links each having means defining an arcuate sprocket engaging surface with the engaging surface of one link directed transversely to the engaging surface of the other link.

6. A chain as set forth in claim 5 wherein each loop link is U-shaped.

7. A chain as set forth in claim 6 wherein each pivot member comprises a cylindrical bushing and associated pin which passes through to connect the planar links to the pivot link.

8. A chain as set forth in claim 7 wherein said bushing is dimpled to cooperate with a groove in the pin.

9. A chain as set forth in claim 4 wherein said pivot link comprises a pivot block having at one end an arcuate sprocket engaging surface permitting sprocket engagement in only one direction, and at the other end an arcuate sprocket engaging surface permitting sprocket engagement in only the opposite transverse direction to said one direction.

10. A chain as set forth in claim 9 wherein each pivot member comprises a pivot pin and associated lock ring.

11. A chain as set forth in claim 1 wherein the single link set is adapted for use with a slotted sprocket tooth.

12. A chain as set forth in claim 1 wherein said pivot link comprises a pivot block having at one end an arcuate sprocket engaging surface cooperating with a similarly disposed surface of an adjacent pivot block to provide sprocket engagement in only one direction.

13. A chain as set forth in claim 12 including an arcuate sprocket engaging surface at the other end of the pivot block and extending at a right angle to the one end sprocket engaging surface.

14. A chain as set forth in claim 1 wherein said pivot link and planar links define an arcuate sprocket engaging surface wherein the arcuate surface is defined by a roller means.

15. A chain as set forth in claim 6 wherein said pivot member comprises a spring and associated recessed pin.

16. A chain as set forth in claim 1 wherein the axes of the first and second pivot pin members are orthogonal.

* * * * *